(No Model.) 5 Sheets—Sheet 1.
F. V. MAQUAIRE.
ELECTRIC ARC LAMP.
No. 477,427. Patented June 21, 1892.
FIG. 1
FIG. 3
FIG. 4
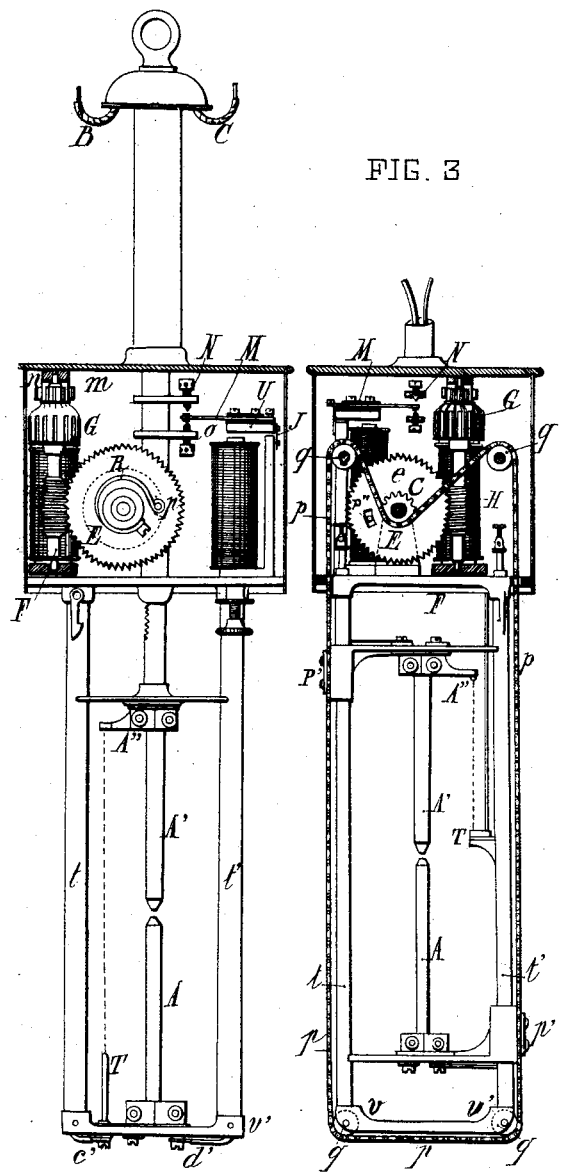
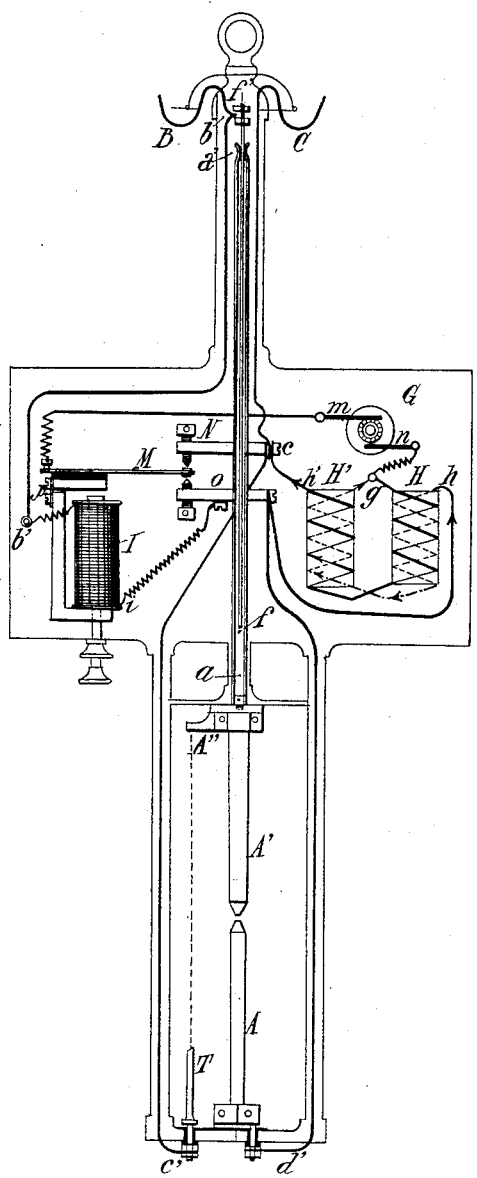
Witnesses:
Harry M. Ruck
Henry E. Everding.
Inventor:
Frédéric Victor Maquaire
by Briesen & Knauth
Attorneys (No Model.)
5 Sheets—Sheet 2.
F. V. MAQUAIRE.
ELECTRIC ARC LAMP.
No. 477,427.
Patented June 21, 1892.
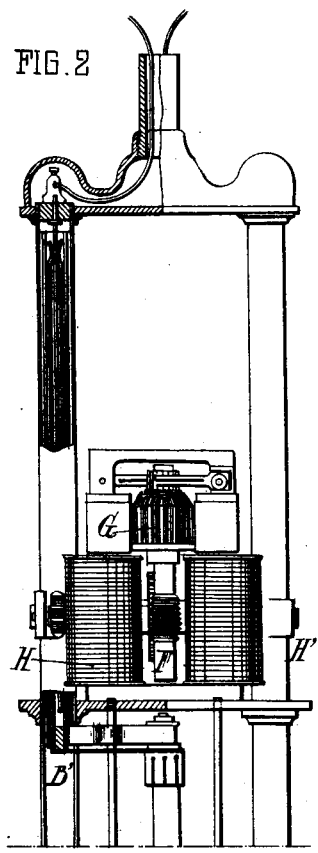
FIG. 2
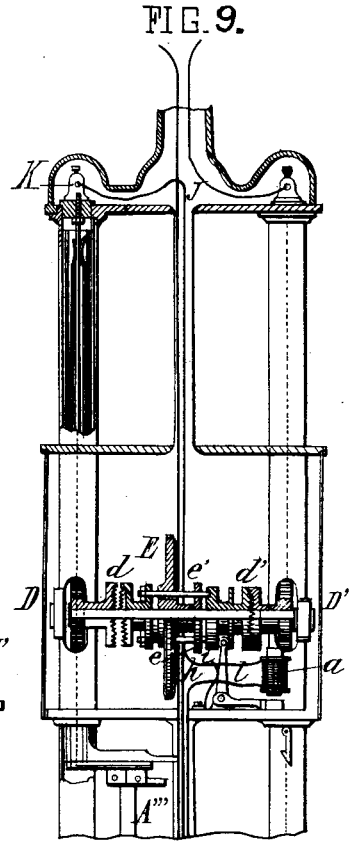
FIG. 9.
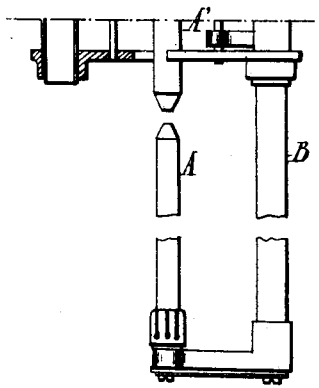
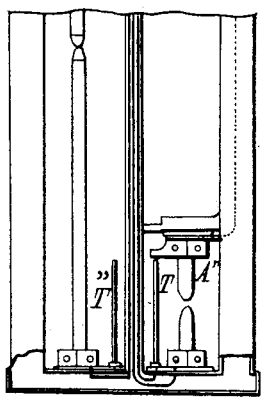
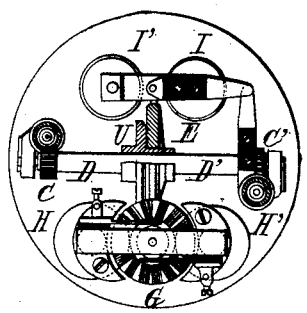
FIG. 8
Witnesses:
Inventor
Frédéric Victor Maquaire
by Briesen & Knauth
Attorneys (No Model.) 5 Sheets—Sheet 3.
F. V. MAQUAIRE.
ELECTRIC ARC LAMP.
No. 477,427. Patented June 21, 1892.
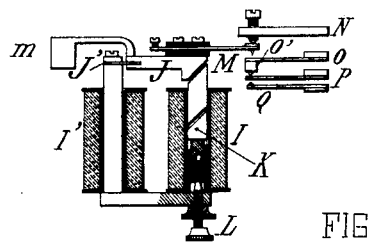
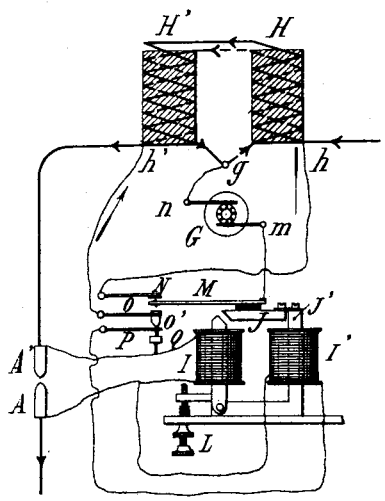
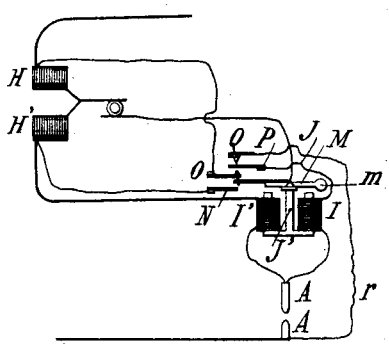
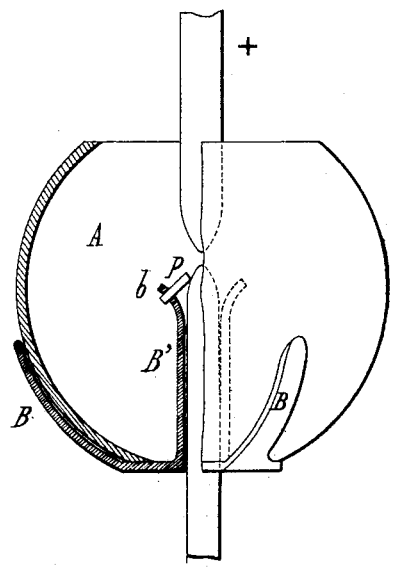
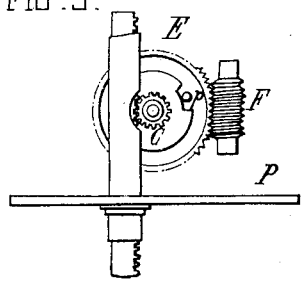
Witnesses:
Harry M. Gurk
Henry E. Cording.
Inventor
Frédéric Victor Maquaire
by Briesen & Knauth
Attorneys (No Model.)
5 Sheets—Sheet 4.
F. V. MAQUAIRE.
ELECTRIC ARC LAMP.
No. 477,427. Patented June 21, 1892.
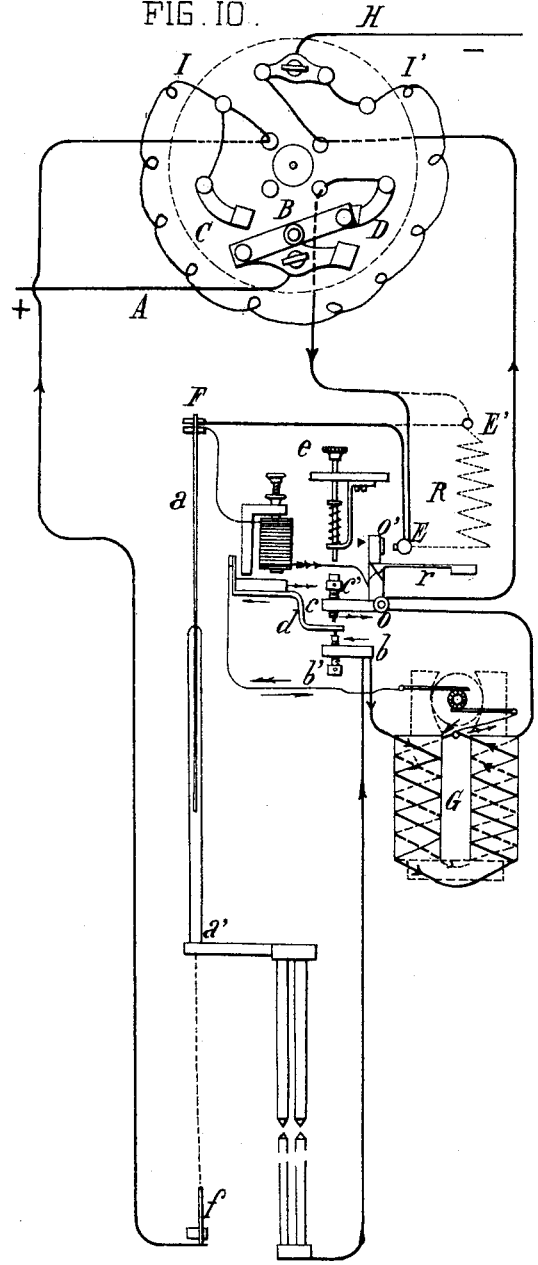
Witnesses:
Harry M. Burk
Henry E. Evriding.
Inventor
Frédéric Victor Maquaire
by Briesen & Knauth
Attorneys

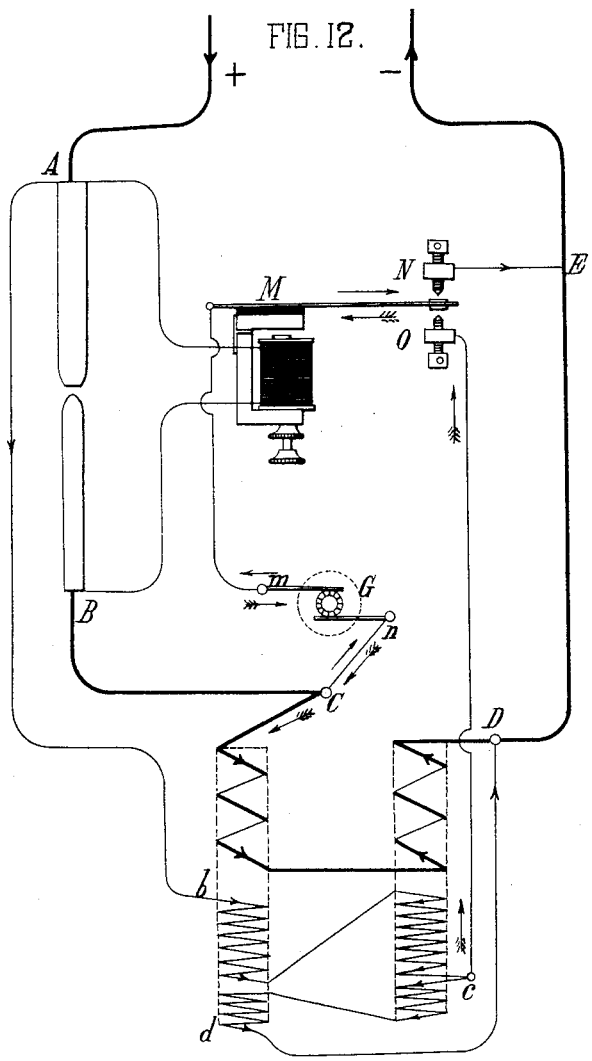

UNITED STATES PATENT OFFICE.

FRÉDÉRIC VICTOR MAQUAIRE, OF PARIS, FRANCE.

ELECTRIC-ARC LAMP.

SPECIFICATION forming part of Letters Patent No. 477,427, dated June 21, 1892.

Application filed August 13, 1890. Serial No. 361,867. (No model.) Patented in France April 19, 1888, No. 190,085; in Belgium July 11, 1888, No. 82,525; in England July 13, 1888, No. 10,209; in Germany July 21, 1888, No. 46,359; in Spain September 28, 1888, No. 8,526; in Italy September 30, 1888, XLVII, 204, and in Austria-Hungary January 2, 1889, No. 37,660 and No. 61,245.

*To all whom it may concern:*

Be it known that I, FRÉDÉRIC VICTOR MAQUAIRE, of the city of Paris, France, have invented an Improved Electromotor and Electro-Metric Balance, (for which I have obtained Letters Patent in France for fifteen years, dated April 19, 1888, No. 190,085; in Germany for fifteen years, dated July 21, 1888, No. 46,359; in Austria-Hungary for fifteen years, dated January 2, 1889, No. 37,660 and No. 61,245; in Italy for fifteen years, dated September 30, 1888, Vol. 47, No. 204; in England for fourteen years, dated July 13, 1888, No. 10,209; in Belgium for fifteen years, dated July 11, 1888, No. 82,525, and in Spain for ten years, dated September 28, 1888, Vol. 7, folio 226, No. 8,526,) of which the following is a full, clear, and exact description.

This invention relates to an improved electromotor and electro-metric balance, and has for its object the maintaining of a fixed strength of electrical current or resistance.

I have taken for illustration the regulation of an electric-arc lamp; and in connection therewith the invention consists in giving to both the lamp-carbons an automatic movement toward or from each other corresponding to the variations of the strength of the electric arc or the direct current. These effects are obtained by means of special arrangements, hereinafter described, especially the two principal agencies which constitute my system of regulation—viz., a special electro-metric balance and a special electromotor.

Referring to the accompanying drawings, Figure 1 is a front elevation of an electric-arc lamp embodying my invention. Fig. 2 is a partial sectional elevation in which the carbon-holders are actuated by an electromotor. Fig. 3 is an elevation showing the electrometric balance. Fig. 4 is an elevation, partly in section, showing parts of the electro-metric balance mechanism. Fig. 5 is a cross-section of the lamp, showing the manner of securing certain parts to the cross-plate. Fig. 5$^{bis}$ is a detail view showing certain parts of the electromotor mechanism. Fig. 6 is a detail view, partly in section, of portions of the electro-metric balance mechanism. Figs. 7 and 8 are diagrammatic elevations of various arrangements of the electro-magnetic balance actuated both by the main and shunt currents. Fig. 9 is an elevation of double-carbon lamps. Fig. 10 is a diagram of a device for cutting out a lamp in a multiple series and substituting a resistance. Fig. 11 shows a mode of supporting a globe upon the negative carbon so as to participate in the change of position of the arc. Fig. 12 shows an arrangement of circuit applicable to regulators in which the approach of the carbons is insured without the use of an electro-metric balance.

The letters of reference indicate the various parts in each figure of the drawings, as described and referred to in this specification.

In Figs. 1, 3, and 4 the electro-magnetic balance is placed in a shunt to the arc.

In Figs. 2 and 3 the carbon-holders are actuated by an electromotor, so as to keep the position of the arc stationary.

In Figs. 7 and 8 the electro-magnetic balance is actuated both by the main and shunt currents.

In Figs. 1, 3, 4, 5, 6, 7, and 8 the principal arrangements of the improved electro-magnetic balance are shown as operated by a closed electro-magnetic circuit excited either by a current derived from the arc alone, as shown in Figs. 1, 3, and 4, or both by the main current and a current derived from the arc, as shown in Figs. 5, 6, 7, and 8, influencing either two distinct coils or a single one. The magnetic circuit, as shown, comprises either one or both cores of the magnetic coils I I' with an armature J, supported by a spring J', and an adjustable core K, arranged within one of the coils and controlled by an adjusting-screw L for limiting the magnetic current. This screw has two screw-heads of slightly-different screw pitch, one screwing into the core K and the other through the cross-bar of the magnetic coil, so that by every turn of the screw the core K is only moved a distance equal to the difference between the pitches of the screw-threads in the heads. The armature J is provided with an insulated pallet M, which not only serves the purpose of closing the circuit through the contact-points N or O, but also can close the circuit through the contact-points P or Q.

In Figs. 6 and 8 the armature J is shown as counterbalanced by a weight $m$, so arranged that its center of gravity coincides with its center of motion, in order to annul the effect of the weight of the armature.

In the electromotor mechanism the armature is preferably a Pacinotti ring G, (shown in Figs. 1, 2, 3, 4, 5, 7, and 8,) and is mounted between the poles-pieces of an electro-magnet H H'. These pole-pieces are so constructed that the polar surface adjacent to the armature is of a radius greater than that of the armature, which thus increases the sensitiveness of the armature. To this armature is secured a spindle, which is provided with a worm F. (Shown in Figs. 1, 2, 3, 4, and $5^{bis}$.) The lower end of this spindle is stepped in a movable piece of conductive metal, which fits in an opening in the yoke of the field-magnet cores, whereby a continuity of the magnetic circuit is attained. The current is carried to the armature-ring G by means of the brushes $m$ and $n$, as shown in Figs. 4 and 7.

The improved carbon-holders shown in the drawings are designed more especially for use in two classes of arc lamps—viz., those in which the position of the arc is movable, as shown in Figs. 1, 4, 9, and 10, and those in which the arc is stationary, as shown in Figs. 2 and 3. As shown in Fig. 1, the lower carbon $A^2$ is fixed in a holder carried by a frame formed of a cross-bar $c'$ and two upright tubes $t\ t'$, secured to the lamp-casing. These tubes guide the upper carbon A' in its movement, and through them also pass two conductors, one connected to the lower-carbon holder and the other for the return of the current when the lamp is short-circuited. The holder of the upper carbon A' is carried by a tubular rod with a toothed rack, which gears into a pinion C, secured upon a shaft carrying a worm-wheel E, meshing into the worm F on the armature-spindle when a sufficiently-strong current passes through the lamp, as shown in Fig. $5^{bis}$. In the absence of a current of such strength the worm-wheel E will revolve freely under the weight of the upper carbon and its holder, thus allowing the two carbons to come in contact.

In order to facilitate the worm and worm-wheel being thrown into gear without injury to either, the wheel is free to move through a small angle independently of the pinion. For this purpose the wheel E is loose on the hub of the pinion C and is connected thereto by a pin $p''$ in the wheel engaging in a recess or notch in a disk or boss attached to the pinion, as shown in Fig. $5^{bis}$. A weak spring R (shown in Fig. 1) is attached to the disk or boss and to the pin $p''$ and tends to hold the wheel and pinion in such relative position that the pin $p''$ is normally in the center of the notch or recess, so that when the worm F is about to be thrown into gear it has only to overcome the force of the spring R in order to come completely with the worm-wheel E and move the pinion C and carbon-holder.

In Figs. 2 and 5 the arc of the lamp is stationary. The lower and upper carbons are carried by two tubular rack-rods B B', which gear into pinions C C' upon the ends D D' of a common shaft, as shown in said Fig. 5, so as to receive motion in opposite directions therefrom, the said shaft being rotated by the worm F on the armature-spindle acting on a worm-wheel on said shaft.

In Fig. 3 both the carbon-holders are shown as moved by means of an endless chain $p$, the carbon-holders being secured to opposite lugs or shoulders $p'\ p'$, secured to said endless chain, so that the carbons, with their holders, will approach or recede from each other simultaneously, and if the carbons are made of the proper diameter the arc will remain immovable. This chain $p$ runs over four pulleys $g$ and under a pinion $e$, mounted on the shaft carrying the worm-wheel E, as shown in said Fig. 3, and the upper-carbon holder being heavier than the lower-carbon holder the automatic approach of the carbons is insured as soon as the worm F is thrown out of gear with the worm-wheel E. The current in this construction is supplied to the carbons by friction-contacts within the insulated tubes $t\ t'$, or the current can be supplied to the carbons by friction-contact of the carbon-holders upon the tubes $t\ t'$, which in this case should be carefully insulated from the body of the lamp.

In the construction shown in Fig. 4 the arc of the lamp is movable and the feeding of the carbons is spontaneous. In this figure, H H' are the field-magnets of the electromotor, the exciting-circuit being formed by two wires wound in a special manner, as shown on each coil, the connection between these wires being such that the current passes through the coils in series. This mode of winding is intended to cause the shunt on the winding of the field-magnets which supplies the armature of the motor and which is distributed by the electro-metric balance, so as to weaken both poles equally.

G is the armature-ring of the electromotor $m$, and $n$ are the brushes.

I is the balance, and M is its insulated lever.

N and O are two adjustable contacts, the closing of the circuit through the contact N causing the carbons to separate and the closing of the circuit through the contact O causing the carbons to approach each other. The current as it enters the lamp passes to the carbon A' through the rod $f'\ f$ in tube $a'\ a$, thence to carbon A, from whence it passes through the conductor $d'$ to the field-magnets H H' and out of the lamp through $c$. A permanent shunt-current will pass from the carbons through the magnetic coil I by means of the conductors $b$ $b'$ and $i$ O. As regards the electromotor, the current entering at $h$ will traverse the first wire of coil H, (shown in dotted lines,) thence over the first wire of coil H' (also shown in dotted lines) to point $g$, whence it will pass through the second wire of coil H, (shown in full lines,) thence over the second wire of coil H', also shown in full lines, and thence out of the lamp through $c$.

The shunt-currents supplying the ring-armature of the motor under the action of the electro-metric balance are as follows: At the moment when a current is sent through the lamp and the carbons are in contact the pallet M will be pressed against the contact N by the spring J' and the shunt-circuit $g$ $n$ G $m$ M N $c$ will be established and the ring armature will then turn in such direction that the carbons will be separated until the desired length of arc has been obtained, when the pallet M will be drawn away from the contact N and remain free between N and O. As the carbons are consumed and the resistance of the arc increases, the strength of the current in the coil I will also increase and draw the pallet M into contact with O. The shunt-circuit $b'$ I O M $m$ G $n$ $g$ will then be established and the direction of the current in the ring armature will be reversed, turning the armature in such direction that the carbons will approach each other until the arc has again become normal or of the desired length. These operations will be repeated until the consumption of the carbons causes the upper-carbon holder to come into contact with the rod T, whereupon the current will pass through the inlet-wire and conductors $f'$ $a'$ $a$ to and through the upper-carbon holder to the rod T and thence out of the lamp by the conductors $c'$ and $c$. All the regulating parts being thus cut out of circuit, the lamp is short-circuited and extinguished. The same result will follow if the short-circuited lamp constitutes one of a series, and the other lamps will continue to burn until they in turn become short-circuited.

When the lamp is to operate in a shunt-circuit, the connection with the conductor $c$ $c'$ is broken, preferably at $c'$, and when the upper-carbon holder in its descent comes in contact with the rod T, which is then an insulated stop, the carbons cannot approach each other in spite of the action of the motor. The lamp will then be extinguished, as well as any other lamp in the same shunt-circuit.

In lamps provided with a device for bringing the carbons together in order to strike the desired arc the operation regarding the electromotor is the same as that described. As regards, however, the electro-metric balance when combined with the said device, as shown in Figs. 5, 6, 7, and 8, the current first passes, as shown in Fig. 7, through the principal circuit $h$ $g$ $h'$, upper carbon A', coil I, and lower carbon $A^2$, so that the coil I, receiving the whole current, will strongly attract the armature J and cause the pallet M to touch the contact O, and through the medium of an insulator O' press P into contact with Q, effecting the union of the coil I with the coil I' for the purpose of protecting the wire of the coil I, and at the same time diminish the resistance of the general circuit until the moment when the carbons come in contact. This will be immediately effected, for the reason that the shunt-circuit $g$ $n$ $m$ M O $h'$ has excited the ring armature G and turned the electromotor in a direction to cause the carbons to approach each other. As soon as the carbons touch each other the pallet M will cease contact with O and be drawn into contact with N, when a new shunt-circuit $h$ N M $m$ $n$ $g$ will be established and excite the ring armature G and turn the electromotor in a direction to cause the carbons to separate.

In Fig. 9 an arrangement is shown whereby protection is given to the wire of the electromagnetic balance in the event of a lamp placed in a shunt-circuit becoming extinguished through lack of carbon. In this arrangement the movable worm-spindle carrier or step-piece carries an insulated arm, to which is connected a conductor $b$, leading to the conductor $b'$. (Shown in Fig. 4.) By this means when the step-piece is in such position that the worm is in gear the lamp is lighted and connection is established between the conductors $b$ and $b'$. When the worm is thrown out of gear, this connection is broken and no current can pass through the electro-metric balance until the carbons have been renewed.

In Fig. 11 is shown an arrangement whereby small globes can be used in lamps of low intensities, and, moreover, the position of the arc in the globe be rendered constant, even when only one carbon is movable. In this construction a globe A rests on a holder B, having a central tube B', through which passes a negative carbon. (Shown in dotted lines in said Fig. 11.) The upper ends of the central tube B' are made flaring, as shown at $b$, each holding a pin $p$, made of platinum or other material, capable of resisting the heat of the point of the negative carbon on which these pins $p$ rest and support the globe-holder, so that the globe descends as fast as the negative carbon is consumed, and thus the central position of the arc in the globe is constant.

In Fig. 9 is shown a lamp provided with two pairs of carbons and in which the transmission of motion from a worm-wheel to each one of the pinions operating one of the movable carbon-holders is effected as follows: Within the body of the lamp, as shown in said Fig. 9, is arranged a rotating spindle D D', on which is secured a worm-wheel E, and on each end of said spindles are pinions adapted to revolve loosely thereon and are driven by friction or other clutches $d$ $d'$, one portion of said clutches being connected to said worm-wheel by pins or bolts $e$ $e'$ passing through holes in the worm-wheel and the other portion of the clutches being secured to a boss or flange on said pinions, so that when the two portions of the clutches are brought together the motion of the worm-wheel will be directly transmitted to the pinions. These clutches are operated by a lever $l$, one end of said lever engaging with one portion of said clutches and the other end serving as an armature of an electro-magnet $a$. A spring can be arranged in any desired manner to act on the lever in such manner as to keep in gear or connection that clutch and pinion corresponding to the first pair of carbons which may be consumed under the same conditions of regulation as heretofore described. When the upper-carbon holder A″ touches the short-circuit contact T, the current passes to the upper carbon A‴ and thence to the positive carbon of the other pair, and in this circuit is included the electro-magnet $a$, which, being excited, attracts the lever-armature $l$ and throws the other clutch and pinion into contact for regulating the second pair of carbons. When this latter pair of carbons are consumed, the upper-carbon holder A‴ will come in connection with the short-circuit contact T″ and the lamp will then be cut out of circuit in the manner heretofore described.

In Fig. 10 is shown an arrangement for automatically cutting out or short-circuiting a lamp when out of order or when it is necessary to substitute a resistance equivalent or not to the arc at the moment when one of the carbons is exhausted or broken or fails to work from any other cause. In this construction, as shown in said Fig. 10, if the current enters at A it may be connected by a pivoted commutator either with C or D. If connected with D, as shown in the figure, the current will pass to E and thence to F, and by the contact-rod and tube $a$ $a'$ to the upper-carbon carrier. After supplying the arc through its passage through the upper and lower carbons and lower-carbon holder it traverses the motor G, contact being made at $b$ $b'$, whereby the extent of separation of the carbons is determined. From the motor G the current passes to the lever $c$, pivoted at $o$, the end of the part $c$ carrying a contact-piece $c'$, which determines the approach of the carbons. This lever $c$ has an arm $o$ $o'$, provided with a double incline on which bears the beveled end of a spring $r$. From $o$ the current passes direct to the terminal H. The strength to the spring $r$ is so adjusted that it will not yield under the normal pressure of the arm $d$ of the electro-metric balance in contact with the contact-screw $c'$ for regulating the arc so long as the latter has not a fall of potential greater than the predetermined maximum limit. Should, however, this limit be exceeded, either in consequence of the breaking of the carbon or a delay in the feeding motion, due either to the accidental failure of the electromotor or to the carbon-holders having reached the end of their course, the electrometric balance will exert sufficient force to overcome the spring $r$ and cause the lever $c$ $o$ $o'$ to oscillate on $o$ and bring $o'$ into contact with E, which contact is again maintained by the spring $r$. As E communicates directly with one of the terminals of the lamp and $o$ with the other lamp-terminal, this contact with E short-circuits the lamp and puts all the mechanism out of action. This same arrangement is also applicable when it is necessary to introduce a resistance between the terminals of a lamp when short-circuited. To accomplish this, it is only necessary to transfer the inner end of the terminal-wire from E to E′ and arrange between the points E and E′ a resistance-coil R, as shown in dotted lines in said Fig. 10. When the cause of the short-circuiting has been removed and the lamp again placed in working order, it will be only necessary to press upon the insulated spring push-rod $e$, and thus restore the lever $c$ $o$ $o'$ to its previous position for normal working.

In the construction shown in Fig. 10 an arrangement is shown for the working of lamps in a multiple series or when two lamps are grouped in series in a desired circuit. It also shows means for automatically substituting a resistance equivalent to the arc when the carbons in one of the lamps become normally exhausted, or the same resistance can be accomplished by turning by the hand the switch B over into contact with C. In the first case, when the upper-carbon holder $a'$ comes in contact with the rod $f$ the carbons are cut out of circuit and the current flows directly through $f$ I and the resistance I I′ to the lamp-terminal H. In the second case the path of the current is limited to the circuit A, B, C, I, and I′ to the lamp-terminal H and no current then flows through the lamp mechanism, and its carbons can be changed without affecting the working of the second lamp in the same series as the first.

In Fig. 12 is shown an arrangement of electrical circuit for the regulator or motor whereby the approach of the carbons is insured without employing an electro-metric balance provided with the additional contact device, as heretofore described, and without any resistance additional to that of the normal working parts of the lamp. In this arrangement the field-magnets of the electromotor are excited by the principal current and by a derivation from the arc. The current exciting the armature is derived from the field-magnet circuit traversed by the principal current when the separation of the carbons takes place, and it is excited from the circuit traversed by the derivation from the arc when the carbons approach each other. To this end the principal circuit, after having supplied the arc, forms the first winding around the field-magnets of the electromotor, the current following the course A B C D and out at E. The electro-balance F is in the shunt-circuit A B to the arc. Another shunt-circuit A b c d D includes the second winding around the field-magnets of the electromotor.

The second winding of the field-magnets above referred to should be so arranged that the resistance of the coil should not abstract too much of the current from the arc, and at the same time should be so proportioned as to sufficiently excite the field-magnets. In this construction, as in those heretofore described, the pallet M of the electro-balance is connected with the collecting-brush m of the ring armature G, while the other brush n is connected to the ingress-point C of the principal circuit extending to the field-magnets, as shown in said Fig. 10. The contact-screw N of the electro-balance is connected with E and the contact-screw O with c, so that the armature will be excited by inverse currents according as the pallet M is in contact with N or O. When the carbons are not in contact, the current has two courses open to it, one through the electro-balance circuit A, F, B, C, and D and the other through the fine or second wire of the field-magnets A b c d D. The armature of the electro-balance F is then strongly attracted and brings M into contact with O, establishing a derivation current through c O M m G n C D E, the current traversing the motor-armature in the direction of the feathered arrows, so as to cause the carbons to approach each other. When the carbons come in contact with each other, the pallet M, being no longer attracted by F, comes in contact with the point N, thus establishing a second derivation current C n G m M N E, the current in this case traversing the motor-armature in the direction of the unfeathered arrows, thus causing the carbons to separate, the working of the regulator being insured under all circumstances without the employment of any supplementary device.

Having thus described my invention, what I claim as new is—

1. In an electric-arc lamp, the combination of an electromotor adapted to operate both the upper and lower carbon holders and an electro-metric balance adapted to maintain absolutely constant the strength of intensity of the current, the said electromotor having an exciting-circuit formed by two separate conductors through each of the electro-magnets traversed by the main current, substantially as described.

2. In an electric-arc lamp, the combination of an electromotor adapted to operate automatically both the upper and lower carbon holders, and an electro-metric balance adapted to regulate the motion of said electromotor, said electromotor having two distinct exciting-circuits adapted to automatically regulate the movement of both carbon-holders, substantially as described.

3. In an electric-arc lamp provided with two pairs of carbons, the combination of an electromotor adapted to automatically operate and control both upper-carbon holders independently of each other, an electro-metric balance adapted to regulate the motion of said electromotor, and means for adjustably connecting and disconnecting the electromotor from the upper-carbon holders, or either of them, through separate short-circuit contacts, substantially as described, and for the purposes set forth.

4. In an electric-arc lamp, the combination of an electromotor adapted to automatically operate and control both upper and lower carbon holders, an electro-metric balance adapted to regulate the motion of said electromotor, and an adjustable core K, a revolving armature connected with said electromotor, magnetic coils I I', and an adjustable sliding block K within one of said coils and adapted to limit the magnetic current of said coils, substantially as described, and for the purposes set forth.

5. In an electric-arc lamp, the combination of an electromotor adapted to automatically operate and control both upper and lower carbon-holders, an electro-metric balance adapted to regulate the motion of said electromotor, and an adjustable armature adapted and arranged with two distinct circuits, substantially as described, and for the purposes set forth.

6. In an electric-arc lamp, the combination of an electromotor adapted to automatically operate and control both upper and lower carbon-holders, an electro-metric balance adapted to regulate the motion of said electromotor, a magnetic coil I, armature J, insulated pallet M, adapted to close the circuit through the coil I, and a shunt-circuit adapted to pass from the carbons through said magnetic coil, substantially as described, and for the purposes set forth.

7. In an electric-arc lamp, the combination, with a rotating worm-spindle carrier, of a wedge-shaped contact-piece in which the spindle-carrier revolves, an insulated arm connected to said contact-piece, and an electric conductor to said arm and adapted to connect with the lamp-circuit, all said parts being adapted and arranged to protect the wire of the balance when the lamp is extinguished, substantially as described.

8. In an electric-arc lamp provided with two pairs of carbons, the combination, with the electromotor, of a worm gear-wheel secured on a shaft and adapted to be rotated by said motor, loose pinions on the ends of said shaft and connected with the carbon-holders, clutches connected to said worm-wheel and adapted to connect with said loose pinions, a lever connected at one end with a clutch, the other end being adapted as an armature, and an electro-magnet, all said parts being arranged and adapted to operate substantially as described, and for the purposes set forth.

9. In an electric-arc lamp, the combination, with the upper and lower carbons, of a globe-support provided with a vertical central tube adapted to surround the lower carbon, pins, of any material capable of withstanding the heat of the carbon, secured in the upper end of the central tube and adapted to rest upon the upper tapering end of the lower carbon, and a globe arranged in said globe-holder, all said parts being arranged and adapted to operate substantially as described, and for the purposes set forth.

The foregoing specification of my improved electric regulator signed by me this 17th day of July, 1890.

FRÉDÉRIC VICTOR MAQUAIRE.

Witnesses:
R. J. PRESTON,
ALBERT MOREAUX.